(12) United States Patent
Zhou et al.

(10) Patent No.: US 8,935,227 B2
(45) Date of Patent: Jan. 13, 2015

(54) REDISTRIBUTING COMPUTATION WORK BETWEEN DATA PRODUCERS AND DATA CONSUMERS

(75) Inventors: Johnny Quan Zhou, Mountain View, CA (US); Nilesh Choudhury, Redwood City, CA (US); Juan R. Loaiza, Woodside, CA (US); Dmitry Mikhailovich Potapov, Redwood City, CA (US); Alexander Tsukerman, Foster City, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 53 days.

(21) Appl. No.: 13/449,192

(22) Filed: Apr. 17, 2012

(65) Prior Publication Data
US 2013/0275402 A1    Oct. 17, 2013

(51) Int. Cl.
*G06F 17/30*      (2006.01)

(52) U.S. Cl.
USPC .......................................................... 707/705

(58) Field of Classification Search
CPC ..................... G06F 17/3007; G06F 17/30091
USPC ....................................................... 707/705
See application file for complete search history.

(56) References Cited

U.S. PATENT DOCUMENTS

| | | | |
|---|---|---|---|
| 4,425,615 A | 1/1984 | Swenson et al. | |
| 5,717,893 A | 2/1998 | Mattson | |
| 6,728,823 B1 | 4/2004 | Walker et al. | |
| 6,922,754 B2 | 7/2005 | Liu et al. | |
| 7,069,324 B1 | 6/2006 | Tiwana et al. | |
| 7,159,076 B2 | 1/2007 | Madter | |
| 7,165,144 B2 | 1/2007 | Choubal et al. | |
| 7,290,090 B2 | 10/2007 | Madter | |
| 7,461,147 B1 | 12/2008 | Mowat et al. | |
| 7,506,103 B2 | 3/2009 | Madter | |
| 7,904,562 B2 | 3/2011 | Takase et al. | |
| 8,244,984 B1 | 8/2012 | Glasco et al. | |
| 8,370,452 B2 | 2/2013 | Harvell et al. | |
| 2004/0117441 A1 | 6/2004 | Liu et al. | |
| 2004/0225845 A1 | 11/2004 | Kruckemyer et al. | |
| 2004/0254943 A1 | 12/2004 | Malcolm | |
| 2005/0160224 A1 | 7/2005 | Cuomo et al. | |
| 2005/0193160 A1 | 9/2005 | Bhatte et al. | |
| 2005/0210202 A1 | 9/2005 | Choubal et al. | |
| 2006/0106890 A1 | 5/2006 | Paul et al. | |
| 2007/0067575 A1 | 3/2007 | Morris et al. | |
| 2007/0260819 A1 | 11/2007 | Gao et al. | |
| 2008/0016283 A1 | 1/2008 | Madter | |
| 2008/0046736 A1 | 2/2008 | Arimilli et al. | |
| 2009/0248871 A1 | 10/2009 | Takase et al. | |
| 2010/0017556 A1 | 1/2010 | Chin et al. | |
| 2011/0047084 A1* | 2/2011 | Manzalini et al. | 705/301 |
| 2012/0159480 A1* | 6/2012 | Matsuzawa | 718/1 |

* cited by examiner

*Primary Examiner* — Rehana Perveen
*Assistant Examiner* — Alexander Khong
(74) *Attorney, Agent, or Firm* — Hickman Palermo Truong Becker Bingham Wong LLP

(57) ABSTRACT

In a consumer-producer distributed model of computing, consumers request data from producers and perform computing work on the data received from the producers, thereby transforming the data. At least some of the computing work performed by a consumer on data provided by the producer is commutable between the consumer and producer, that is, either the producer as well as the consumer can perform the computing work on the data. A producer redistributes commutable based on the work load of the producer and consumer as well as other factors.

10 Claims, 3 Drawing Sheets

REDISTRIBUTING COMPUTATION WORK BETWEEN DATA PRODUCERS AND DATA CONSUMERS

CROSS-REFERENCE TO RELATED APPLICATIONS; BENEFIT CLAIM

This application is related to application Ser. No. 12/631, 985, Caching Data Between A Database Server And A Storage System, filed by Kiran Badrinarain Goyal, et al., on Dec. 7, 2009, the contents of which are incorporated by reference.

This application is related to application Ser. No. 12/691, 146, Selectively Reading Data From Cache And Primary Storage, filed by Kothanda Umamageswaran, et al., on Jan. 21, 2010, the contents of which are incorporated by reference.

FIELD OF THE INVENTION

The present invention relates to distributed computer systems comprising consumers that request data from producers, such a database servers that request data from storage devices.

BACKGROUND

In a consumer-producer distributed model of computing, consumers request data from producers and perform computing work on the data received from the producers, thereby transforming the data. An example of a consumer-producer model is a database system, where database servers are consumers and storage devices are producers of data stored on the storage devices. To compute rows to return for a query, a database server requests from storage devices data blocks containing rows. Once a database server receives the requested data blocks, the database server performs computing work on the data blocks, which may include filtering rows based on one or more criteria specified in the query.

In a variant of the consumer-producer distributed model, at least some of the computing work performed by a consumer on data provided by the producer is commutable between the consumer and producer, that is, either the producer as well as the consumer can perform the computing work on the data. In the database system in the current illustration, even though the database server is configured to filter rows stored in data blocks, the database server requests the storage device to provide data blocks that contain already filtered rows. Described herein are techniques for improving performance of systems where the consumers and producers can perform commutable work.

BRIEF DESCRIPTION OF THE DUNWORKEDINGS

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 1:
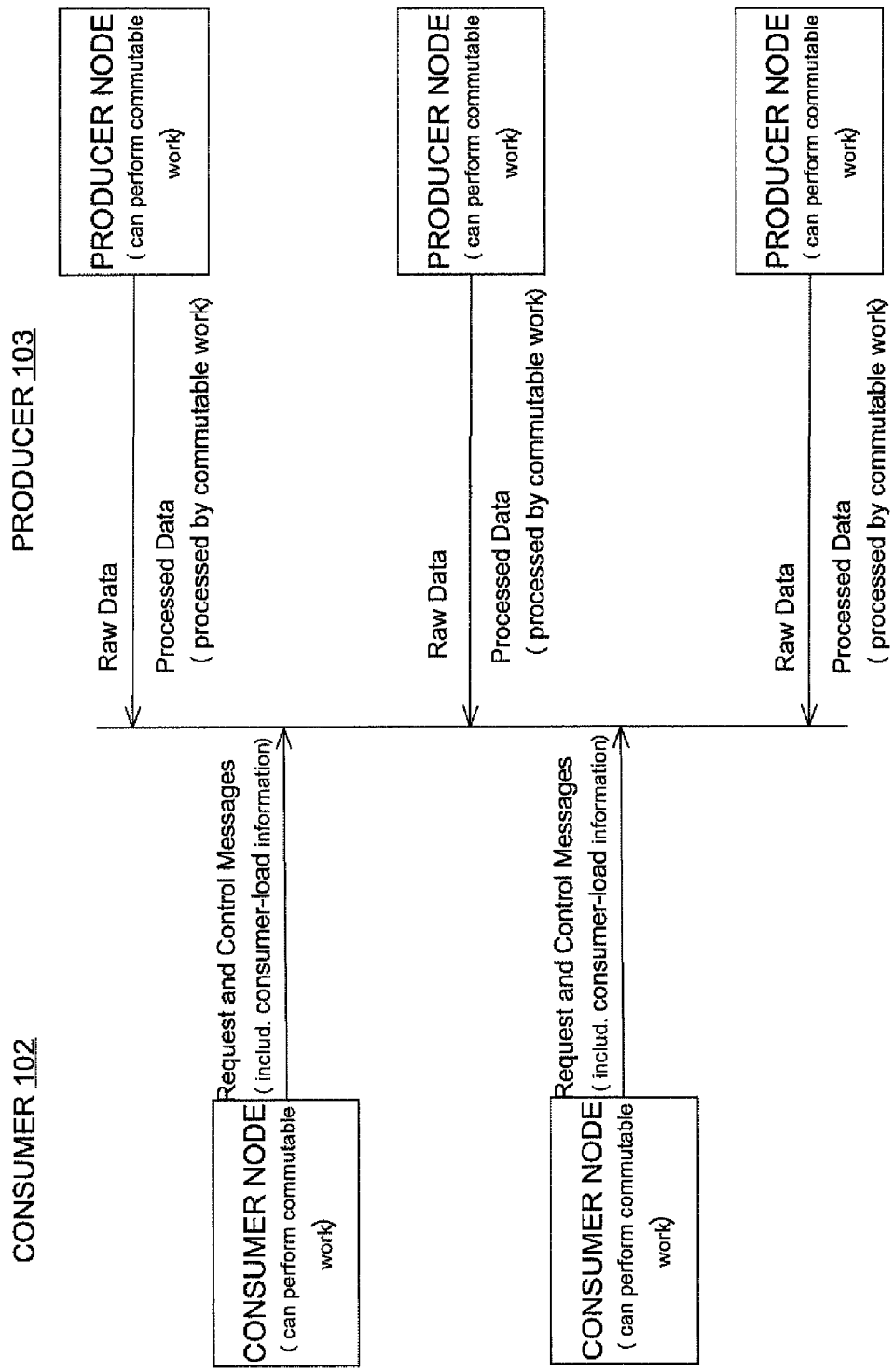
FIG. 1 depicts a model for a consumer-producer distributed system that performs commutable computing work, according to an embodiment of the present invention.

FIG. 1 depicts a model of a consumer-producer distributed system that performs commutable computing work ("commutable work"), where the commutable work is balanced between a consumer and producer to efficiently use computing resources in the distributed system.

Referring to FIG. 1, it depicts a consumer-producer distributed system 101 that comprises computing nodes that collectively and/or individually operate as a consumer or a producer. A "computing node", as the term is used herein, refers to a set of one or more processes (under control of an operating system) and a portion of memory and/or other computer resources, that are allocated for performance of one or more functionalities pursuant execution of software by said one or more processes. A computing node is also referred to herein as a node. A node includes a "server" or "server instance" that is configured to respond to requests from various clients and applications for one or more services and/or functionalities.

Examples of nodes include without limitation database servers that manage data in one or more databases, storage devices that store data persistently for database servers, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

Both producer 103 and consumer 102 are multi-node systems, each comprising any multiple number of nodes. Consumer 102 comprises multiple consumer nodes and producer 103 comprises multiple producer nodes. Embodiments of the present invention are illustrated using consumers and producers that are each multi-node systems, however an embodiment of the present invention is not so limited.

Consumer nodes interact with producer nodes via request and control messages to communicate requests for data and other information needed to support interoperability. A request for data may be a request for worked data ("worked data request") or a request for unworked data ("unworked data request"). Worked data is transformed source data which has already been processed by producer 103 by performing commutable work on the data as requested by consumer 102 in a worked data request, the commutable work being work that is commutable between the producer 103 and consumer 102. Unworked data is data provided by the producer 103 that has not been processed by the producer by performing such commutable work. Source data is data from a source from which producer provides worked or unworked data, e.g. persistent storage, volatile memory cache, another producer.

For example, a consumer node is a database server and a producer node is a storage device. To compute a query, the database server may request filtered rows of a particular table that are stored in data blocks. The request also specifies filtering criteria specified in the query. The data blocks are stored in persistent memory managed by the storage device. Both the database server and storage device are capable of and are configured and/or programmed to filter rows in data blocks according to such filtering criteria. In response, the storage device returns data blocks that contain filtered rows that the storage device filtered according to the filtering criteria. Such data blocks are an example of worked data.

Alternatively, upon receipt of the request for filtered rows, the storage device may determine, based on the current work load of both the storage device and database server, that the consumer device should filter the rows. Thus, in response to the worked data request for filtered rows, the producer provides copies of the data blocks containing unfiltered rows, thereby providing data blocks without performing the requested commutable work of filtering rows. Such data blocks are an example of unworked data. When the data blocks are received by the database server, the database server filters the rows.

Describing as unworked data that is returned by the producer to the consumer does not necessarily mean that the producer has not performed computing work on the data or has not transformed the data in any way. For example, data stored in persistent memory by the storage device may be compressed. The data is decompressed before being provided to the consumer. Such decompression and the concomitant compression is work that between the database server and the storage device, only the storage device is configured to perform and in fact does perform.

In general, when consumer 102 requests data from producer 103, one consumer node transmits a message to any of producer nodes 103. In response, one or more of producer nodes 103 returns unworked or worked data to the requesting consumer node 102, any other consumer node 102, or any combination of consumer nodes 102 thereof. As a result, any consumer node 102 may perform commutable work of any unworked data that was returned by producer 103 in response to a worked data request for any consumer node 102.

Push-Back of Commutable Work

The term "push back" refers to the act of a producer 103 to, in response to receiving a worked data request from consumer 102, determine that consumer 102 should perform at least a portion of the commutable work requested, and pursuant to the determination, returns unworked data for that portion of the commutable work. The worked data request is referred to as being pushed back. The unworked data returned as a result of determining not to perform the commutable work is also referred as being pushed back. The worked data requested for which the push backed unworked data is returned is also referred to as being push backed. In response to a worked data request, producer 103 may push back all or a portion of commutable work/worked data requested.

A determination to push back is based on a variety factors. The factors include, without limitation, the work load of producer 103 ("producer-side workload"), the work load of consumer 102 ("consumer-side workload"), the nature of commutable work requested, work-load side-effects on the producer of pushing back commutable work. If the producer-side workload is determined to be high and consumer-side workload is low, indicating the consumer has resources available to perform the commutable work, then the producer may forego performing some or all the commutable work and return unworked data in lieu of the worked data.

However, the nature of commutable work may be such that it is vastly more efficient for producer 103 to perform the commutable work and not push back despite the workload of producer 103. Or, a work-load side effect on producer 103 of pushing back commutable work of filtering rows may be to create far more additional work for producer 103 in transmitting a much larger set of unfiltered rows over the network rather than a smaller set of filtered rows, thereby creating more work than what is saved by not filtering at producer 103.

In such cases, ignoring producer-side workload, producer 103 may determine to provide the worked data as requested and perform the respective commutable work regardless.

According to an embodiment, producer 103 pushes back commutable work to balance work load between producer 103 and consumer 102. This type of work load balancing is referred to herein as producer-side load balancing. Because producer-side balancing may not only be based on producer-side workload but also on consumer-side workload, producer 103 requires information indicating consumer-side workload. Consumer-load information transmitted by consumer 102 indicates consumer-side workload. An embodiment of the present invention is not limited to use of push back to balancing work load between consumer 102 and producer 103.

There are various forms of consumer-load information. Consumer-load information may simply be a binary flag indicating that a particular consumer node 102 requesting worked data does or does not have resources available to perform commutable work requested, or that consumer 102 as a whole does or does not have resources available. Consumer-load information may indicate the level of work load of consumer 102 in general or of one or more particular consumer nodes, allowing producer-side workload balancing to weigh the respective workloads on each system. Consumer load information may be transmitted as part of a message requesting worked data transmitted by consumer 102 to producer 103, or may be transmitted separately within the request and control messages.

Database Example

Producer-side load balancing of commutable work is illustrated herein within the context of a database system. However, an embodiment of the present invention is not so limited. The database system is depicted in FIG. 2.

Figure 2:
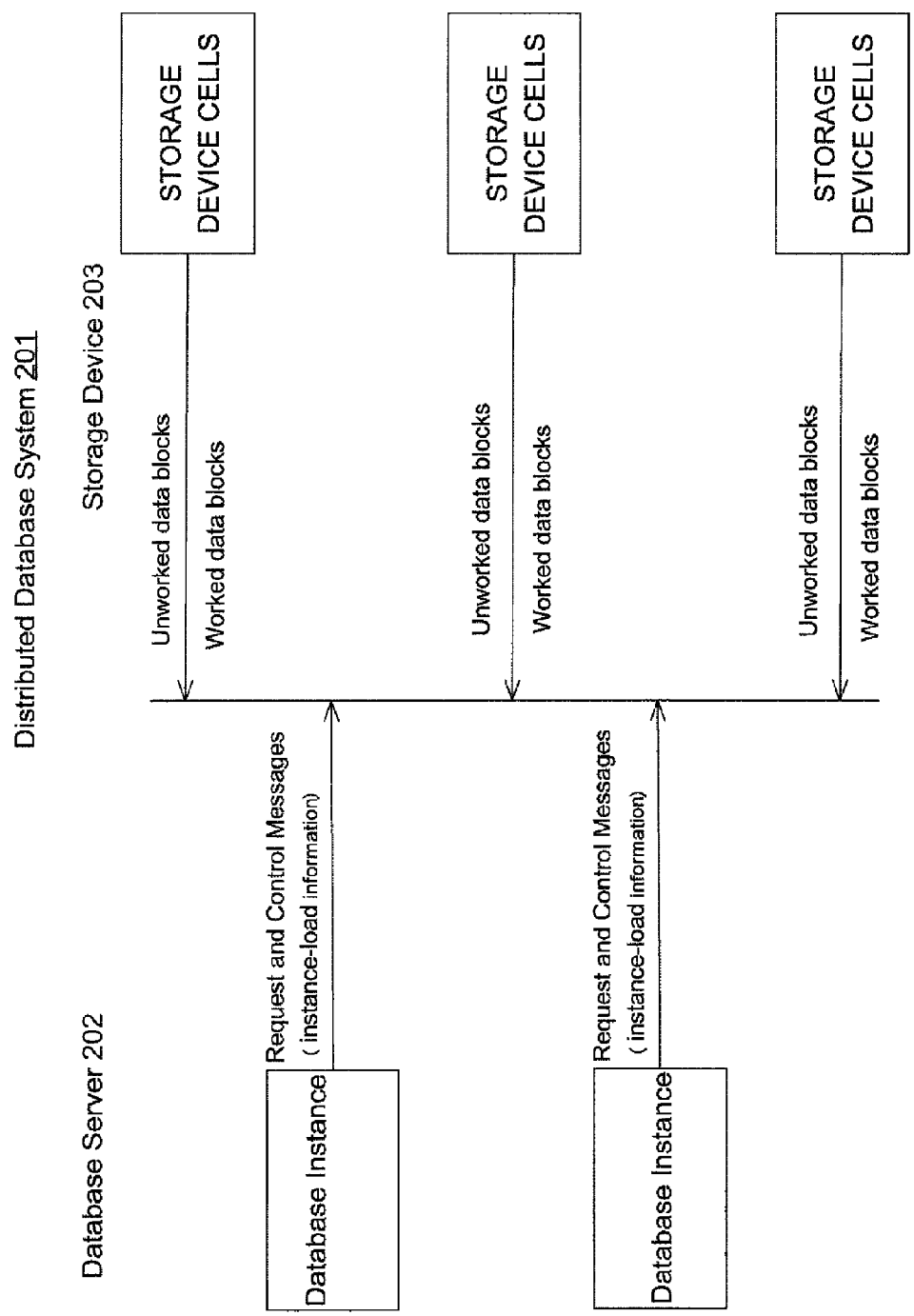
FIG. 2 depicts a distributed database system representing an implementation of the model for the consumer-producer distributed system, according to an embodiment of the present invention.

Referring to FIG. 2, it depicts a database system 201. Database system 201 comprises database server 202 and storage device 203. A database server governs and facilitates access to a particular database, processing requests by clients to access the database.

A database comprises data and metadata that is stored on a persistent or volatile memory mechanism. Database metadata defines database objects, such as tables and columns therein, object tables, views, or complex types, such as object types, and functions. The database managed by database server 202 is stored on storage device 203.

Database server clients interact with database server 202 to access data in the database managed by database server 202. Clients access the database data by submitting to database server 202 commands, such as queries, that cause database server 202 to perform operations on data stored in a database. A database command may be in the form of a database statement that conforms to a database language, such as the Structured Query Language (SQL). There are many different versions of SQL, some versions are standard and some proprietary, and there are a variety of extensions. Data manipulation language ("DML") statements are issued to a database server to query or request changes to a database. Data definition language ("DDL") instructions are issued to a database server to create or configure database objects, such as tables, views, or complex data types, or to control how DML statements are to be processed.

According to an embodiment, an application client issues database server commands via a database session. A session, such as a database session, is a particular connection established for a client to a server, such as a database instance, through which the client issues a series of requests (e.g., requests for execution of database statements).

Storage Device

Storage device 203 is a multi-node server that stores data, including database data, for database server 202. Storage device 203 comprises one or more computing nodes referred to as storage device cells. Data managed and stored by a storage device 203 is stored in persistent memory, such hard disk drives or flash memory. Storage device 203 may use multiple types of persistent memory, such as a combination of hard drives and flash memory.

Storage device 203 is a block mode device that provides a client, such as database server 202, access to data in units referred to as a data block. A data block is the atomic unit of database data that a storage device client may request to read from storage device 203. Data in storage device 101 is also organized by "storage data blocks". Storage data blocks that storage device 203 provides to database server 202 are copies of the version stored in persistent storage on storage device 203.

The computing power of storage device 203 is exploited to perform commutable work on storage blocks in response to worked data requests by database server 202. To request "worked data blocks", database server 202 transmits a "worked data block request" to storage device 203.

For example, to compute a query specifying to return rows from a table that are filtered according to a query row predicate, database server 202 transmits a worked data-block request to storage device 203 to provide worked data blocks from storage blocks storing rows for the table. The request includes filtering criteria reflecting the filtering conditions specified by the row predicate. In response to the worked data block request, storage device 203 provides worked data blocks containing filtered rows, thereby performing the commutable work of filtering the rows according to the filtering conditions.

As another example, a database server 202 transmits a worked data block request to storage device 203 to provide rows with projected columns from storage blocks storing rows from a table, that is, return only certain columns for the rows stored in the storage blocks. In response to the worked data block request, the storage device 203 provides the worked data blocks containing rows with only the projected columns, performing the commutable work of projecting the columns.

Storage device 203 also provides copies of storage blocks. Such copies are an example of unworked data blocks. Furthermore, blocks returned by storage device 203 do not have a fixed sized (e.g. number of bytes), that is, the size can vary. Database server 202 may also request unworked storage data blocks ("unworked data block request"), and in response, storage device 203 returns unworked data blocks.

Storage Device-Side Loading Balancing

Storage device 203 performs producer-side work load balancing. Workload balancing decisions are based on factors similar to those discussed already. According to an embodiment, a storage device cell 203 determines an "instance push back level" for each database service instance 202 for which the storage device cell 203 services data block requests. An instance push back level is a portion of commutable work to push back for a database instance 202. A storage device cell 203 periodically adjusts instance push-back levels maintained for each database server instance 202. Adjustments to an instance push-back level are based on information about the work load of both the respective storage device cell 203 and database server instance 202. Work load information about the storage device cell 203 includes, without limitation, the CPU utilization, memory utilization, disk and flash subsystem utilization and types of tasks being performed on the storage device cell 203.

The work load information about a database server instance 202 includes, without limitation, an instance load flag maintained by storage device cell 203 for a database server instance 202. The instance load flag for a database instance 202 is maintained based on periodic updates of the instance load flag transmitted by the database instance 202 to storage device 203. The instance load flag is set to one of two states, denoted herein as PUSH and NO PUSH. For a database server instance 202, the instance load flag is set to PUSH to indicate that the work load is such that the database server instance 202 can handle more work. LESS means the opposite.

The instance push back level for each database server instance 202 is adjusted according to determinations made periodically by a storage device cell 203. For example, determinations to adjust are made at intervals of a fraction second to enable automatic, dynamic, and responsive work load balancing.

The storage device cell 203 determines to increase an instance push back level for a database server instance 202 when the storage device cell 203 determines that its work load is too heavy. For example, when a storage device cell 203 determines that its CPU utilization exceeds a threshold and instance load flag for database server instance 202 is set to PUSH, the storage device cell 203 adjusts the instance push back level for the database server instance 202 upward.

The storage device cell 203 determines to decrease an instance push back level for a database server instance 202 when the storage device cell 203 determines that its work load is not too heavy and the instance load flag is set to NO PUSH, indicating the work load on database server instance 202 would benefit by reducing the commutable work the database server instance 202 performs. For example, when a storage device cell 203 determines that its CPU utilization is below a threshold percentage and the instance load flag for database server instance 202 is set to NO PUSH, the storage device cell 203 adjusts the instance push back level for the database server instance 202 downward.

To push back commutable work, a storage device cell 203 forgoes performing commutable work on a portion of the storage data blocks that need to be processed to service a worked data block request. For example, a database server instance 202 issues a worked data block request requiring a storage device cell to read 1000 storage data blocks and filter the rows in the storage data blocks. The instance push back level requires filtering 75% of the rows from storage data blocks. In response to the worked data block request, the storage device cell 203 returns 250 storage data blocks and one or more worked data blocks containing rows filtered from the remaining 750 storage blocks. When the database server 202 receives the 250 storage data blocks, database server 202 recognizes from the content of the storage data blocks that storage data blocks are unworked data blocks. In response to making this recognition, database server instance 202 performs the commutable work of filtering the rows in the storage data blocks.

When adjusting an instance push back level, a storage device cell 203 makes the adjustments incrementally to avoid abruptly changing the work load on either a database server instance 202 or storage device cell 203. For example, adjustments made in response to determining to increase or decrease the instance push back level are made in 5% increments.

In an embodiment, the instance push back level is never adjusted above a maximum threshold.

Finally, for worked data block requests requesting commutable work, commutable work is not pushed back depending on the nature of commutable work required or the workload side-effects on the storage device cell 203 of pushing back commutable work. For example, a worked data block request may request column projection of a column of the table. The table may store rows in column-major format. In column major format, the column values of a table are stored contiguously in storage data blocks. In this situation, storage device 203 can perform the column projection operation so efficiently that the commutable work of projecting the columns is not pushed back even when other factors favor pushing back the commutable work.

Determining when to Adjust Push Back Level

According to an embodiment, a database server instance 202 periodically determines the state of the instance push back flag and sends update messages to storage device 203, which accordingly updates the instance push back flags that storage device 203 maintains on its storage device cells. The periodic determinations may be based on various kinds work load information generated by a database server. The periodic determinations may be made and the updates transmitted at intervals of a fraction of a second to enable automatic, dynamic, and responsive work load balancing.

The present invention is not limited to any particular kind of work load information. The following is only an example of workload information that may be used to compute the instance push back flag. According to embodiment, a database server instance 202 generates the following work load information.

Current Resource Wait Time A database server instance tracks resource wait times. When certain applications or users use a disproportion amount of resources (e.g. CPU time), other applications or users may not be receiving sufficient resources to maintain satisfactory levels of performance. To remedy such an imbalance, applications or users may be placed in a resource wait state, allowing other applications or users to receive a greater portion of resources to use. A database server instance tracks current resource wait times as a percentage of time any applications or users are currently in a resource wait state. A non-zero current resource wait time indicates that some applications or users of a database server instance are being deprived of sufficient resources. Push backing commutable work to the database server instance could worsen the deprivation and system performance.

Operating System Schedule Delay Operating systems tracks current CPU scheduling delay experienced by processes and process threads. If the processes and threads of a database server are currently experiencing scheduling delay, then the processes and threads are less likely to be available to perform pushed back commutable work.

Worked Data Block Request Wait Time When a database server instance issues a worked data block request, the database server instance may wait for the return of data blocks in response to the request when there is no other work for the database server to perform. A database server instance tracks current worked data block request wait times as the percentage of time a database server instance currently spends waiting for the return of a worked data block request. A higher percentage indicates that a database server instance has available CPU time to perform commutable work.

According to an embodiment, a database server instance 202 periodically determines and sets the instance push back load flag as follows. When the database server instance determines that both the current resource wait time and current CPU scheduling delay are zero, and that the current worked data block request wait time is greater than 10 percent, the push back load flag is set to PUSH. If the database server instance determines otherwise, then the push back load flag is set to no PUSH. In an embodiment of the present invention, determining the instance push back level may be based any combination of current resource wait time, current CPU scheduling delay, and current worked data block request wait time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
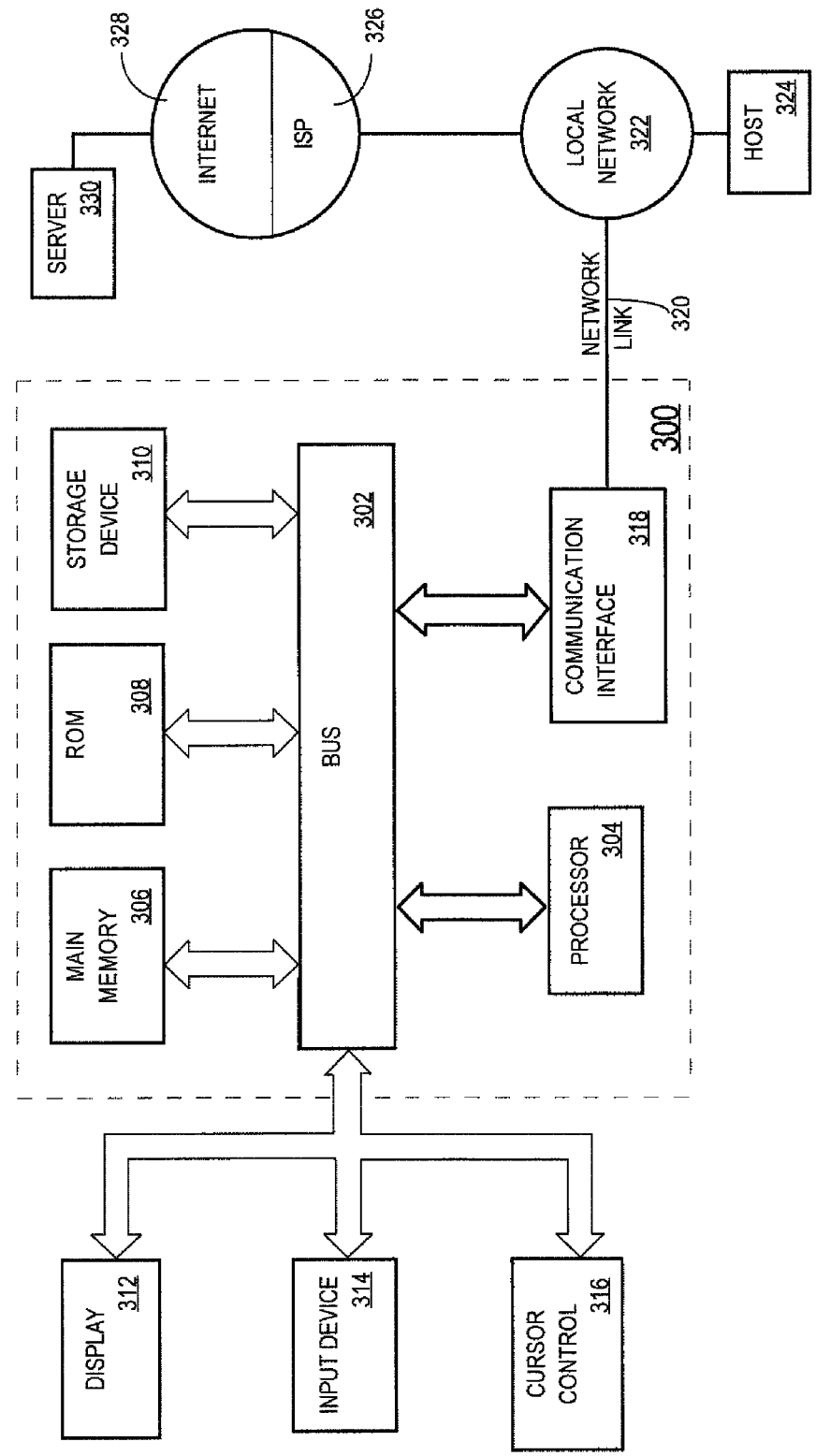
FIG. 3 is a computer system that may be used to implement an embodiment of the present invention.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   a storage device receiving a worked data block request from a database server, said worked data block request requesting worked data blocks generated by commutable work performed by said storage device on storage data blocks, wherein said storage device and said database server are configured to perform said commutable work, wherein said database server is configured to transmit said worked data block request to compute a query conforming to a database language;
   based on one or more factors, said storage device determining to push back at least a portion of said worked data blocks requested by said worked data block request as unworked data blocks;
   in response to determining to push back at least a portion of said worked data blocks, returning to said database server unworked data blocks in lieu of said portion of said worked data blocks;
   wherein said storage device comprises one or more computing nodes; and
   wherein the steps of the method are performed by said one or more computing nodes.

2. The method of claim 1, wherein the one or more factors include work load on the storage device.

3. The method of claim 1, wherein the one or more factors include work load on the database server.

4. The method of claim 3, the steps of further including:
   the storage device maintaining a flag indicating whether said database server has available resources to accept pushed back commutable work;
   the storage device receiving from the database server updates to the flag; and
   wherein the one or more factors include the flag.

5. The method of claim 1, wherein the one or more factors include a type of the commutable work.

6. A non-transitory computer-readable medium storing instructions which, when executed by one or more processors, cause:
- a storage device receiving a worked data block request from a database server, said worked data block request requesting worked data blocks generated by commutable work performed by said storage device on storage data blocks, wherein said storage device and said database server are configured to perform said commutable work, wherein said database server is configured to transmit said worked data block request to compute a query conforming to a database language;
- based on one or more factors, said storage device determining to push back at least a portion of said worked data blocks requested by said worked data block request as unworked data blocks;
- in response to determining to push back at least a portion of said worked data blocks, returning to said database server unworked data blocks in lieu of said portion of said worked data blocks; and
- wherein said storage device comprises one or more computing nodes.

7. The non-transitory computer-readable medium of claim 6, wherein the one or more factors include work load on the storage device.

8. The non-transitory computer-readable medium of claim 6, wherein the one or more factors include work load on the database server.

9. The non-transitory computer-readable medium of claim 8, the instructions further including instructions for:
- the storage device maintaining a flag indicating whether said database server has available resources to accept pushed back commutable work;
- the storage device receiving from the database server updates to the flag; and
- wherein the one or more factors include the flag.

10. The non-transitory computer-readable medium of claim 6, wherein the one or more factors include a type of the commutable work.

* * * * *

UNITED STATES PATENT AND TRADEMARK OFFICE
CERTIFICATE OF CORRECTION

PATENT NO.        : 8,935,227 B2                                             Page 1 of 1
APPLICATION NO.   : 13/449192
DATED             : January 13, 2015
INVENTOR(S)       : Zhou et al.

It is certified that error appears in the above-identified patent and that said Letters Patent is hereby corrected as shown below:

In the Specification

In column 1, line 51, delete "DUNWORKEDINGS" and insert -- DRAWINGS --, therefor.

Signed and Sealed this
Eighth Day of September, 2015

Michelle K. Lee
*Director of the United States Patent and Trademark Office*